US008638555B2

(12) United States Patent
Bekele

(10) Patent No.: US 8,638,555 B2
(45) Date of Patent: *Jan. 28, 2014

(54) PROTECTIVE COVER FOR LAPTOP COMPUTER

(71) Applicant: Tech Shell, Inc., Pensacola, FL (US)

(72) Inventor: Haile Bekele, Pensacola, FL (US)

(73) Assignee: Tech Shell, Inc., Pensacola, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,524

(22) Filed: Oct. 15, 2012

(65) Prior Publication Data

US 2013/0039007 A1 Feb. 14, 2013

Related U.S. Application Data

(63) Continuation of application No. 13/047,147, filed on Mar. 14, 2011, now Pat. No. 8,289,703, which is a continuation of application No. 12/544,906, filed on Aug. 20, 2009, now Pat. No. 7,907,400, which is a continuation of application No. 11/788,329, filed on Apr. 19, 2007, now Pat. No. 7,643,274.

(60) Provisional application No. 60/745,323, filed on Apr. 21, 2006.

(51) Int. Cl.
*G06F 1/16* (2006.01)
(52) U.S. Cl.
USPC ...................................... 361/679.55; 206/320
(58) Field of Classification Search
USPC ...................................... 361/679.55; 206/320
See application file for complete search history.

(56) References Cited

U.S. PATENT DOCUMENTS

| 5,632,373 | A | * | 5/1997 | Kumar et al. ................. 206/305 |
| 5,682,993 | A | * | 11/1997 | Song ............................. 206/320 |
| 5,768,095 | A | * | 6/1998 | Nakamura et al. ....... 361/679.09 |
| 5,835,344 | A | * | 11/1998 | Alexander ............... 361/679.46 |
| D446,196 | S | * | 8/2001 | Chamberlain et al. ....... D14/137 |
| 6,480,377 | B2 | * | 11/2002 | Genest et al. ............ 361/679.43 |

(Continued)

FOREIGN PATENT DOCUMENTS

| GB | 2 418 298 A | 3/2006 |
| WO | 2007/015086 A1 | 2/2007 |

OTHER PUBLICATIONS

USPTO Appeal Board Decision in related Inter Partes Reexamination No. 95/001,767, Patent No. 7,907,400, mailed Sep. 13, 2013.

*Primary Examiner* — Lisa Lea Edmonds
(74) *Attorney, Agent, or Firm* — Thomas | Horstemeyer, LLP

(57) ABSTRACT

An exterior cover for a laptop computer having a display portion and a keyboard portion is disclosed. The exterior cover includes a first rigid planar element for placement on an outside surface of the display portion. The first rigid planar element includes a raised edge along a perimeter of the first rigid planar element, wherein the raised edge extends toward the display portion. The first rigid planar element further includes a plurality of tabs located on the raised edge, wherein each tab extends from the raised edge for gripping the display portion. The exterior cover further includes a second rigid planar element for placement on an outside surface of the keyboard portion. The second rigid planar element includes a raised edge extending toward the keyboard portion. The second rigid planar element further includes a plurality of tabs for gripping the keyboard portion.

20 Claims, 4 Drawing Sheets

(56) References Cited

U.S. PATENT DOCUMENTS

| | | | |
|---|---|---|---|
| 6,835,344 B2 * | 12/2004 | Hong et al. | 264/322 |
| 7,191,926 B1 * | 3/2007 | Costantino et al. | 224/605 |
| 7,290,654 B2 * | 11/2007 | Hodges | 206/320 |
| 7,303,077 B2 * | 12/2007 | Harlocker | 206/576 |
| 7,414,833 B2 * | 8/2008 | Kittayapong | 361/679.27 |
| 7,643,274 B2 * | 1/2010 | Bekele | 361/679.02 |
| 7,778,026 B2 * | 8/2010 | Mitchell | 361/679.55 |
| 7,886,903 B1 * | 2/2011 | Wurzelbacher et al. | 206/320 |
| 7,907,400 B2 * | 3/2011 | Bekele | 361/679.55 |
| 8,289,703 B2 * | 10/2012 | Bekele | 361/679.55 |
| 2001/0009500 A1 * | 7/2001 | Selker | 361/683 |
| 2005/0098456 A1 * | 5/2005 | Hodges | 206/320 |
| 2005/0200608 A1 * | 9/2005 | Ulla et al. | 345/168 |
| 2005/0279661 A1 * | 12/2005 | Hodges | 206/320 |
| 2006/0042996 A1 * | 3/2006 | Picot et al. | 206/586 |
| 2006/0124482 A1 * | 6/2006 | Hodges | 206/320 |
| 2006/0226040 A1 * | 10/2006 | Medina | 206/320 |
| 2007/0119734 A1 * | 5/2007 | Pichahchi | 206/320 |
| 2007/0227923 A1 * | 10/2007 | Kidakarn | 206/320 |
| 2007/0247801 A1 * | 10/2007 | Bekele | 361/683 |
| 2009/0310297 A1 * | 12/2009 | Bekele | 361/679.54 |
| 2010/0044259 A1 * | 2/2010 | Wang | 206/320 |
| 2010/0300909 A1 * | 12/2010 | Hung | 206/320 |
| 2011/0162987 A1 * | 7/2011 | Bekele | 206/320 |

* cited by examiner

PROTECTIVE COVER FOR LAPTOP COMPUTER

CROSS-REFERENCE TO RELATED APPLICATIONS

This is a continuation application which claims priority to U.S. Ser. No. 13/047,147, filed Mar. 14, 2011, entitled "Protective Cover for Laptop Computer", which application is a continuation of and claims priority to U.S. Ser. No. 12/544,906, filed Aug. 20, 2009, entitled "Protective Cover for Laptop Computer," which application is a continuation of and claims priority to U.S. application Ser. No. 11/788,329, filed Apr. 19, 2007, entitled "Protective Cover for Laptop Computer,", which application claims priority to provisional patent application Ser. No. 60/745,323 filed Apr. 21, 2006 and entitled "Protective Hard Plastic Case for Laptops." All of the above applications are hereby incorporated herein by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates to accessories for personal computers, and more particularly to protective accessories for laptop personal computers.

BACKGROUND OF THE INVENTION

As computers become more ubiquitous and as individuals become more mobile, laptop computer sales are on the rise. Individuals are increasingly requiring computing capabilities and information on the go. As such, today it is customary to walk into a coffee shop or a library only to see large groups of individuals sitting at tables doing work, playing games, listening to music or reading on their laptops. Laptops can be more expensive than desktop computers due to the lighter materials, lower voltage parts and mobile components that comprise the laptop computer. For this reason, individuals are typically protective of their laptops, leading to the rise of the laptop accessory industry.

One problem that users often encounter with laptop computers is wear and tear on the exterior of the laptop. Since users often carry around their laptops and use them in cafes, restaurants, libraries, on the floor, in a car, on a subway or in any location not intended for computer use, it is inevitable that the exterior of the laptop will be scratched, dinged, dented, cracked, broken, stained, etc. Since most laptop exteriors are comprised of plastic, there is little one can do to fix such blemishes.

One approach to this problem has been to create laptop covers that comprise mostly a sleeve into which the laptop is inserted while it sin the closed position. This approach solves the problem of protecting the laptop while it is stored away, but does not solve the problem of protecting the laptop while it is in use. This approach, furthermore, requires that the user has to remove the laptop from the protective sleeve before every use, adding another step to the process of preparing the laptop for use, which can be a turnoff for users that are continually moving and lacking time.

Another problem that users often encounter with laptop computers is overheating of the bottom of the laptop. The power supply components of laptops are located on the bottom surface of the keyboard portion of the laptop. During long periods of use, the bottom of the laptop can overheat and burn or cause discomfort to the user if the laptop is sitting on his or her lap. Further, a user's genitalia are near the lap region of an individual and there are health hazards associated with overheating of the scrotum or the vagina. When testicles are exposed to exorbitant heat over long periods of time, for example, an individual's fertility can be affected. Additionally, if a laptop is resting on top of a piece of furniture, such as a table or a desk, an overheating laptop can cause damage to the surface of the furniture.

Therefore, a need exists to overcome the problems with the prior art as discussed above, and particularly for a more efficient way to protect the exterior of laptop computers and to manage the heat generated by the laptop computer during use.

SUMMARY OF THE INVENTION

Briefly, in accordance with one embodiment of the present invention, an exterior cover for a laptop computer having a display portion and a keyboard portion is disclosed. The exterior cover includes a first rigid planar element for placement on an outside surface of the display portion. The first rigid planar element includes a raised edge along a perimeter of the first rigid planar element, wherein the raised edge extends toward the display portion. The first rigid planar element further includes a plurality of tabs located on the raised edge, wherein each tab extends from the raised edge for gripping the display portion. The exterior cover further includes a second rigid planar element for placement on an outside surface of the keyboard portion. The second rigid planar element includes a raised edge along a perimeter of the second rigid planar element, wherein the raised edge extends toward the keyboard portion. The second rigid planar element further includes a plurality of tabs located on the raised edge, wherein each tab extends from the raised edge for gripping the keyboard portion.

In another embodiment of the present invention, an exterior cover for a laptop computer having a display portion and a keyboard portion is disclosed. The exterior cover includes a first rigid planar element having a rectangular shape for covering a top surface of the display portion. The first rigid planar element includes a raised edge for covering a section of all sides of the display portion. The first rigid planar element further includes a plurality of tabs located on the raised edge, wherein each tab extends from the raised edge for gripping the display portion. The exterior cover further includes a second rigid planar element having a rectangular shape for covering a bottom surface of the keyboard portion. The second rigid planar element includes a raised edge for covering a section of all sides of the keyboard portion. The second rigid planar element further includes a plurality of tabs located on the raised edge, wherein each tab extends from the raised edge for gripping the keyboard portion.

In another embodiment of the present invention, a protective cover for a laptop computer is disclosed. The protective cover includes a first rectangular sheet comprised of a rigid material for fastening to an outside surface of a display portion of the laptop computer. The first rectangular sheet includes a plurality of protruding tabs located on opposing sides of the first rectangular sheet, wherein the plurality of tabs extend toward the display portion for gripping the display portion. The protective cover further includes a second rectangular sheet comprised of a rigid material for fastening to an outside surface of a keyboard portion of the laptop computer. The second rectangular sheet includes a plurality of protruding tabs located on opposing sides of the second rectangular sheet, wherein the plurality of tabs extend toward the keyboard portion for gripping the keyboard portion.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

Figure 1:
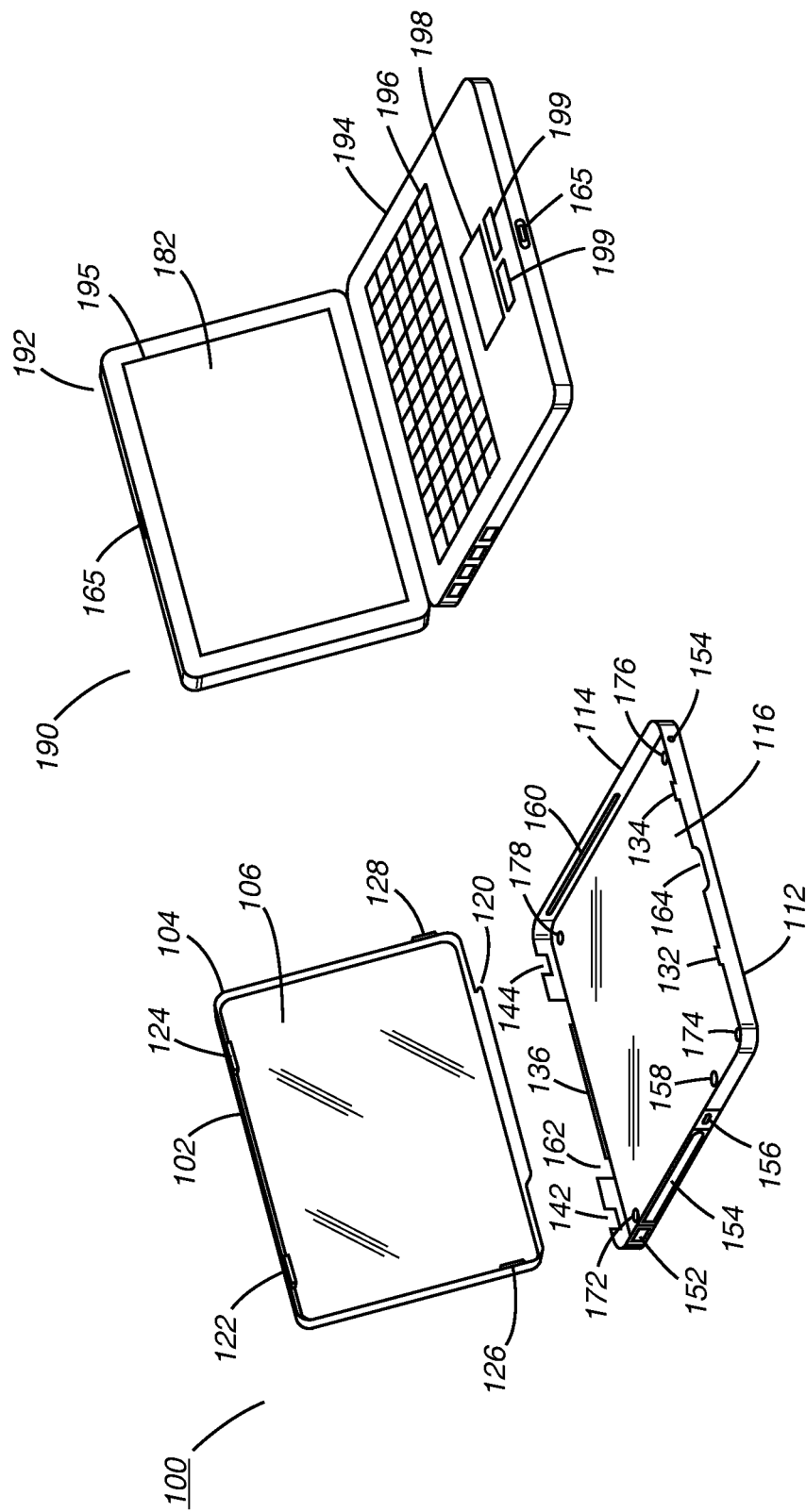
FIG. 1 is an illustration of a perspective view of the elements comprising the exterior cover for a laptop computer, in accordance with one embodiment of the present invention.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The present invention, according to a preferred embodiment, overcomes problems with the prior art by providing a rigid exterior cover for laptop computers, wherein the exterior cover comprises one separate piece for applying to the outside surface of the display portion of the laptop computer and a second separate piece for applying to the outside surface of the keyboard portion of the laptop computer. The present invention further solves problems with the prior art by providing an exterior cover that simply snaps onto the laptop computer using a plurality of tabs that are pushed into place around the laptop by applying manual pressure, thereby allowing for easy and fast application and removal. Further, the present invention solves problems with the prior art by providing an exterior laptop cover that dissipates the heat created by the bottom of the laptop computer during use, thereby eliminating or reducing the negative effects of an over-heated laptop computer on individuals and furniture.

FIG. 1 is an illustration of a perspective view of the elements comprising the exterior cover 100 for a laptop computer 190, in accordance with one embodiment of the present invention. FIG. 1 shows a laptop computer 190 having a display portion 192, which includes a liquid crystal display 195 or other form of computer display, and a keyboard portion 194, which includes a keyboard 196, a touch pad 198, and buttons 199. The display portion 192 comprises an inside surface 182 and an outside surface (not shown) located on the opposite as the inside surface 182. Likewise, the keyboard portion 194 includes an inside surface 184 and an outside surface (not shown) located on the opposite as the inside surface 184.

FIG. 1 further shows a separate, or independent, rigid planar sheet 102 for applying to the outside surface of the display portion 192 of the laptop computer 190. The rigid planar sheet 102 may be substantially rectangular with rounded corners. The rigid planar sheet 102 may further include a raised edge 104 disposed around the circumference or perimeter of the rigid planar sheet 102, wherein the raised edge 104 extends perpendicularly from the rigid planar sheet 102 and extends toward the inside surface 106 of the rigid planar sheet 102.

Rigid planar sheet 102 may further include a plurality of tabs 122, 124, 126, 128 located along the raised edge 104 of the rigid planar sheet 102. Each of the plurality of tabs 122, 124, 126, 128 may extend higher than the raised edge 104. Additionally, each of the plurality of tabs 122, 124, 126, 128 may include a protruding element that extends perpendicularly from the raised edge 104 towards the inside surface 106 of the rigid planar sheet 102. More detail on the protruding element of each tab is provided below with reference to FIGS. 3-6. The use of tabs allows for the rigid planar sheet 102 to snap onto the display portion 192 of the laptop computer 190 by applying manual pressure, thereby allowing for easy and fast application and removal of the rigid planar sheet 102.

Note that two tabs 122, 124 are located along a top of the rigid planar sheet 102, while one tab 126 is located on a left side of the rigid planar sheet 102 and one tab 128 is located on a right side of the rigid planar sheet 102. Also note that tabs 126 and 128 are located on opposite ends of the rigid planar sheet 102 so as to provide pressure in opposite directions towards the center of the display portion 192 when applied. This pressure secures the rigid planar sheet 102 into the display portion 192.

The raised edge 104 disposed around the circumference or perimeter of the rigid planar sheet 102 covers at least a portion of the sides of the display portion 192 when applied. FIG. 1 further shows a super raised edge 120 located along the bottom of the rigid planar sheet 102, wherein the super raised edge 120 is raised higher than the raised edge 104.

FIG. 1 further shows a separate, or independent, rigid planar sheet 112 for applying to the outside surface of the keyboard portion 194 of the laptop computer 190. The rigid planar sheet 112 may be substantially rectangular with rounded corners. The rigid planar sheet 112 may further include a raised edge 114 disposed around at least a portion of the circumference or perimeter of the rigid planar sheet 112, wherein the raised edge 114 extends perpendicularly from the rigid planar sheet 112 and extends toward the inside surface 116 of the rigid planar sheet 112.

Rigid planar sheet 112 may further include a plurality of tabs 132, 134, 136 located along the raised edge 114 of the rigid planar sheet 112. Each of the plurality of tabs 132, 134, 136 may extend higher than the raised edge 114. Additionally, each of the plurality of tabs 132, 134, 136 may include a protruding element that extends perpendicularly from the raised edge 114 towards the inside surface 116 of the rigid planar sheet 112. More detail on the protruding element of each tab is provided below with reference to FIGS. 3-6. The use of tabs allows for the rigid planar sheet 112 to snap onto the keyboard portion 194 of the laptop computer 190 by applying manual pressure, thereby allowing for easy and fast application and removal of the rigid planar sheet 112.

Note that two tabs 132, 134 are located along a bottom of the rigid planar sheet 112, while one tab 136 is located on a top side of the rigid planar sheet 112. Also note that tabs 132, 134 are located on opposite ends of the rigid planar sheet 112 as tab 136 so as to provide pressure in opposite directions towards the center of the keyboard portion 194 when applied. This pressure secures the rigid planar sheet 112 into the keyboard portion 194.

The raised edge 114 of rigid planar sheet 112 includes lower or retracted portions 142, 144 located along a top of the rigid planar sheet 112. These retracted portions 142, 144 are not raised as high as the raised edge 114 and either provide an open area for a movable part, such as a hinge connecting the keyboard portion 194 with display portion 192, or provide access to a portion of the keyboard portion 194, such as a power connection, a light, a data port, a button or a removable media drive.

The raised edge 114 of rigid planar sheet 112 further includes shaped orifices 152, 154, 156 located along a left side of the rigid planar sheet 112. These shaped orifices 152, 154, 156 provide access to a portion of the keyboard portion 194, such as a power connection, a light, a data port, a button or a removable media drive. Also note shaped orifice 158 (for air circulation) located along the rigid planar sheet 112, shaped orifice 159 located along a bottom side of the raised edge 114 and shaped orifice 160 located along a right side of the raised edge 114. These shaped orifices 152, 154, 156, 158, 159, 160 provide access to a portion of the keyboard portion 194, such as a power connection, a light, a data port, a button or a removable media drive. For example, orifice 160 may provide access to a CD/DVD drive while orifice 159 may provide access to an LED light. Note that each orifice is shaped according to the shape of the item to which it is providing access.

The raised edge 114 disposed around the circumference or perimeter of the rigid planar sheet 112 covers at least a portion of the sides of the keyboard portion 194 when applied. FIG. 1 further shows an area 162 located along the top of the rigid planar sheet 112 wherein the raised edge 114 is either lower or non-existent. Area 162 may provide an open area for a movable part, such as a hinge connecting the keyboard portion 194 with display portion 192. Also note lower edge 164, which is lower than raised edge 114. Lower edge 164 may provide access to a mechanism 165, such as a latch, for opening or closing the laptop computer 190.

Lastly, note depressions 172, 174, 176, 178 located on the rigid planar sheet 112. The depressions 172, 174, 176, 178 are located near the corners of the rectangular rigid planar sheet 112. Each depression 172, 174, 176, 178 causes a protrusion on the opposite side (not shown) of the rigid planar sheet 112. A "foot" or elastic, pill-shaped element (comprised of rubber or plastic) may be adhered to the protrusion on the opposite side (not shown) of the rigid planar sheet 112, so as to protect furniture or any surface from scratching or damage when the rigid planar sheet 112 is placed on it.

Rigid planar sheets 102 and 112 may be manufactured from a variety of materials including metal, such as stainless steel, titanium, aluminum or any metal alloy, rigid fabric, carbon fiber, epoxy resin, graphite, rubber, plastic or any combination of the above.

Plastic covers a range of synthetic or semi-synthetic polymerization products. Plastics are composed of organic condensation or addition polymers and may contain other substances to improve performance or economics. In the present invention, plastic may comprise any one of the following forms of plastic: polyethylene, polystyrene, high impact polystyrene, polyethylene terephthalate, nylon, polypropylene, acrylonitrile butadiene styrene (ABS), bayblend and polyvinylidene chloride (PVC).

The rigid planar sheets 102 and 112 may be manufactured of the present invention can be manufactured from a plastic compound using any variety of processes, such as injection molding, fusible core injection molding and thermoforming.

Injection molding is a manufacturing technique for making parts from thermoplastic material in production. Molten plastic is injected at high pressure into a mold, which is the inverse of the product's shape. After a product is designed by an industrial designer, molds are made by a mold-maker from metal, usually either steel or aluminum, and precision-machined to form the features of the desired part. Injection molding is widely used for manufacturing a variety of parts and is the most common method of plastic production.

The most commonly used thermoplastic materials are polystyrene, ABS or acrylonitrile butadiene styrene, nylon, polypropylene, polyethylene, and polyvinyl chloride or PVC.

Injection molding machines, also known as presses, hold the molds in which the components are shaped. Presses are rated by tonnage, which expresses the amount of clamping force that the machine can generate. This pressure keeps the mould closed during the injection process.

Molds separate into at least two halves (called the core and the cavity) to permit the plastic part to be extracted. In general, the shape of a part must not cause it to be locked into the mould. For example, sides of objects typically cannot be parallel with the direction of draw (the direction in which the core and cavity separate from each other). They are angled slightly. Pins are the most popular method of removal from the core, but air ejection, and stripper plates can also be used depending on the application. Most ejection plates are found on the moving half of the tool, but they can be placed on the fixed half.

Molds are built through two main methods: standard machining and EDM machining. Standard machining, in its conventional form, has historically been the method of building injection molds. With technological development, computer numerical control (CNC) machining became the predominant means of making more complex molds with more accurate mold details in less time than traditional methods.

The electrical discharge machining (EDM) or spark erosion process has become widely used in mold making. EDM is a simple process in which a shaped electrode, usually made of copper or graphite, is very slowly lowered onto the mould surface (over a period of many hours), which is immersed in paraffin oil. A voltage applied between tool and mould causes erosion of the mould surface in the inverse shape of the electrode.

Fusible core injection molding or lost core injection molding is a specialized plastic injection molding process. It is used in the manufacture of molded components with cavities or undercuts, which would not be possible with tools having demoldable cores. The process consists of three essential steps. First, a core consisting of a low melting point metal is poured in the shape of the cavity specified for the molded component. This is inserted into the injection mold in the second step and injected with plastic. Molded component and core are both demolded and, in the third step, immersed in a heated bath to melt out the core. The bath temperature is selected to be somewhat higher than that of the core alloy's melting point, but not so that the injected part would be damaged. Induction heating of the core metal in the heated bath reduces the melt out time to a few minutes. Liquid core metal collects on the bottom of the heated bath and is usable for a new core.

Thermoforming is a manufacturing process for thermoplastic sheet or film. The sheet or film is heated between infrared, natural gas, or other heaters to its forming temperature. Then it is stretched over or into a temperature-controlled, single-surface mold. Cast or machined aluminum is the most common mold material, although epoxy and wood tooling are sometime used for low volume production. The sheet is held against the mold surface unit until cooled. The formed part is then trimmed from the sheet. The trimmed material is usually reground, mixed with virgin plastic, and reprocessed into a usable sheet. There are several categories of thermoforming, including vacuum forming, pressure forming, twin-sheet forming, drape forming, free blowing, and simple sheet bending.

In one embodiment of the present invention, rigid planar sheets 102 and 112 may be manufactured from a material that is a solid color (or multiple solid colors), a transparent color (or multiple transparent colors) or may include a pattern or other series of multiple colors in a variety of selections. In another embodiment of the present invention, rigid planar sheets 102 and 112 may include graphics, designs, logos, pictures, or any images that can be applied to the planar sheets. The graphics may be embedded in the material comprising the rigid planar sheets 102 and 112 or the graphics may be stamped, painted, stenciled, laser etched, printed, engraved or silk-screened onto the exterior or interior surfaces of the planar sheets.

In one embodiment of the present invention, rigid planar sheets 102 and 112 may be manufactured from a material that dissipates or insulates the heat created by the laptop 190 during use. The material used to manufacture the rigid planar sheets 102 and 112, such as plastic, may possess heat isolative properties that prevent the outside surface of the exterior cover 100 from overheating. Alternatively, the material used to manufacture the rigid planar sheets 102 and 112, such as metal, may possess heat conductive properties that quickly dissipate the heat originating from the laptop 190. Alternatively, the material used to manufacture the rigid planar sheets 102 and 112 may possess any combination of heat insulating and heat conducting properties so as to accomplish the goal of re-directing the heat emanating from the use of the laptop 190 so as not to be directed downwards towards the bottom of the laptop. Such redirection of the laptop heat is beneficial as it reduces or eliminates the negative implications of high temperatures along the bottom of a laptop, including overheating or burning of a person's lap when the laptop is sitting on top of a user's lap and overheating of a table, desk or other furniture, thereby leading to damaged furniture.

Furthermore, shaped orifices 152, 154, 156, 158, 159, 160 may provide access to a space 420 (see FIG. 4) between the rigid planar sheet 112 and the keyboard portion 194. This space 420 may provide an area for heat convection wherein air is the medium. As the bottom of the keyboard portion 194 is heated, the air in the space 420 is heated while cooler air enters the space 420 via orifice 158 (among others). As relatively hot air rises, so does the heated air move towards the top of the keyboard portion 194 to escape as cooler air rushes upwards into space 420 to fill the void. In this way, the temperature of the bottom of the keyboard portion 194 is regulated by heat convection so as not to overheat.

Figure 2:
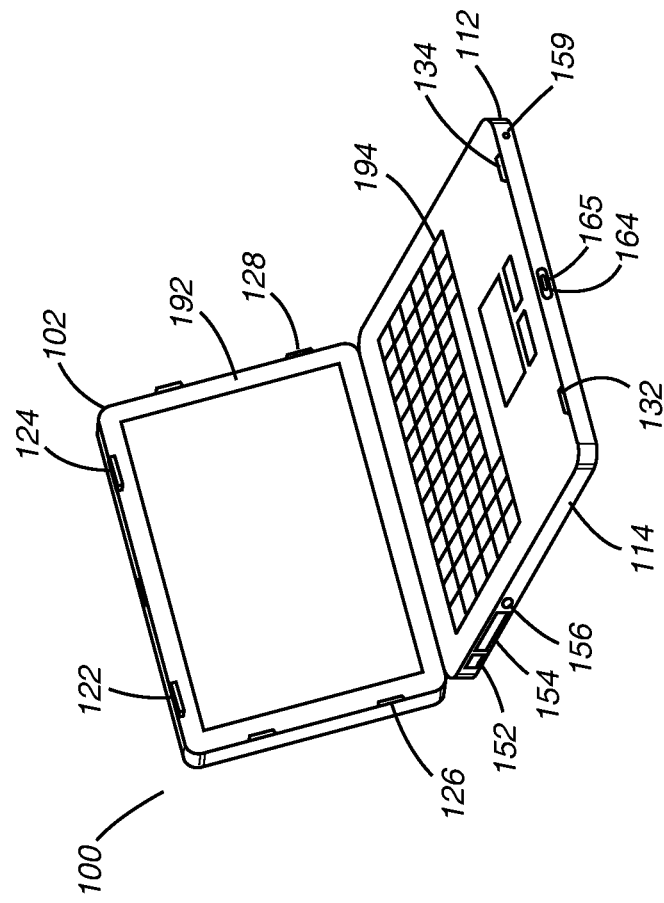
FIG. 2 is an illustration of a perspective view of the exterior cover of FIG. 1, after application to a laptop computer.

FIG. 2 is an illustration of a perspective view of the exterior cover 100 of FIG. 1, after application to the laptop computer 190. Note that rigid planar sheet 102 has been applied to the display portion 192 and rigid planar sheet 112 has been applied to the keyboard portion 194. Note also that the rigid planar sheets 102 and 112 can be applied to the laptop 190 while the laptop is either in the open or closed position. The plurality of tabs 122, 124, 126, 128 of the rigid planar sheet 102, each having a protruding element, allow for the rigid planar sheet 102 to snap onto the display portion 192 of the laptop computer 190 by applying manual pressure, thereby allowing for easy and fast application and removal of the rigid planar sheet 102. Tabs 126 and 128 are located on opposite ends of the rigid planar sheet 102 so as to provide pressure in opposite directions towards the center of the display portion 192 when applied. This pressure secures the rigid planar sheet 102 into the display portion 192.

The plurality of tabs 132, 134 and 136 (not shown) of the rigid planar sheet 112, each having a protruding element, allow for the rigid planar sheet 112 to snap onto the keyboard portion 194 of the laptop computer 190 by applying manual pressure, thereby allowing for easy and fast application and removal of the rigid planar sheet 112. Tabs 132, 134 are located on opposite ends of the rigid planar sheet 102 as tab 136, so as to provide pressure in opposite directions towards the center of the keyboard portion 194 when applied. This pressure secures the rigid planar sheet 112 into the keyboard portion 194.

The rigid planar sheet 112 includes shaped orifices 152, 154, 156 located along a left side of the rigid planar sheet 112, the orifices providing access to a portion of the keyboard portion 194, such as a power connection, a light, a data port, a button or a removable media drive. Also note shaped orifice 159 located along a bottom side of the raised edge 114. These shaped orifices 152, 154, 156, 159 provide access to a portion of the keyboard portion 194, such as a power connection, a light, a data port, a button or a removable media drive. Note that each orifice is shaped according to the shape of the item to which it is providing access. Also note lower edge 164, which may provide access to a mechanism 165, such as a latch, for opening or closing the laptop computer 190.

Figure 3:
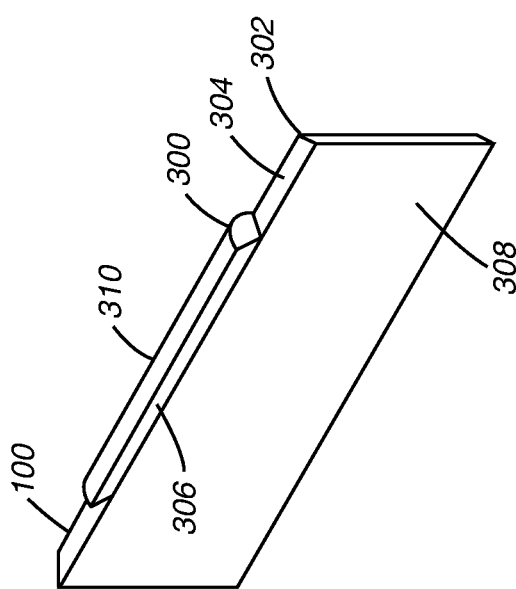
FIG. 3 is a perspective detail view of a first tab for securing a rigid planar sheet of the exterior cover to a laptop computer, in accordance with one embodiment of the present invention.

FIG. 3 is a perspective detail view of a first tab 300 for securing a rigid planar sheet of the exterior cover 100 to a laptop computer 190, in accordance with one embodiment of the present invention. The first tab 300 may describe tabs 122, 124, 126, 128 132, 134 of FIG. 1 in more detail. FIG. 3 shows that first tab 300 is attached to a top surface 304 of raised edge 302, analogous to raised edge 104 or 114. The first tab 300 includes a flat surface 306 that slopes inward or extends toward the inside surface 308 of the edge 302. The flat surface 306 connects to the top surface 304 of raised edge 302. The first tab 300 has a rounded back 310 that curves back away from the surface 306 and connects to the raised edge 302.

Figure 4:
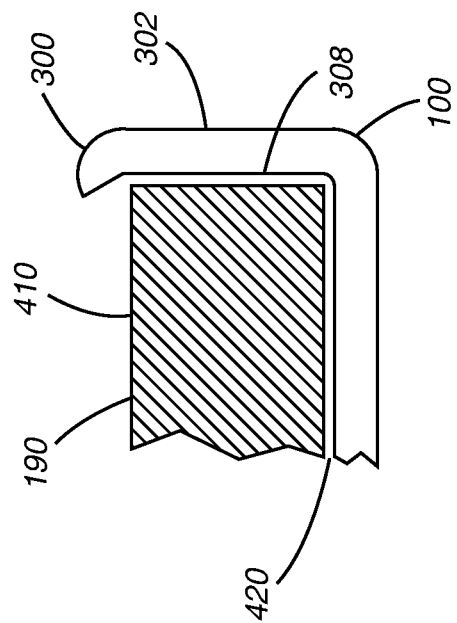
FIG. 4 is a cross-sectional detail view of the first tab for securing a rigid planar sheet of the exterior cover to a laptop computer, in accordance with one embodiment of the present invention.

FIG. 4 is a cross-sectional detail view of the first tab 300 for securing a rigid planar sheet of the exterior cover 100 to a laptop computer 190, in accordance with one embodiment of the present invention. FIG. 4 shows that flat surface 306 of tab 300 slopes inward or extends toward the inside surface 308 of the raised edge 302. As the laptop 190 is inserted into the exterior cover 100, the tab 300 may be pushed back or away from the inside surface 308 of the edge 302 so as to allow for the full width of the laptop 190 to be inserted into the exterior cover 100. The malleable or elastic nature of the material comprising the exterior cover 100, such as plastic, allows for the tab 300 to be pushed back or away from the inside surface 308 of the edge 302 without breaking the tab 300, while allowing for the tab 300 to return to its initial shape or arrangement after the full width of the laptop 190 is inserted into the exterior cover 100.

FIG. 4 shows that after insertion of the laptop 190 into the exterior cover 100, the flat surface 306 of tab 300 slopes inward toward the laptop, thereby extending over the top surface 410 of the laptop 190 so as to grip the laptop 190. This positioning keeps the laptop 190 from moving upwards and exiting the exterior cover 100 since the tab 300 grips the laptop 190 to secure it in place. Thus, tab 300 secures the laptop 190 within the exterior cover 100. The application of enough force, however, may force the tab 300 to be pushed back or away from the inside surface 308 of the edge 302 so as to allow for the full width of the laptop 190 to exit the exterior cover 100.

Figure 5:
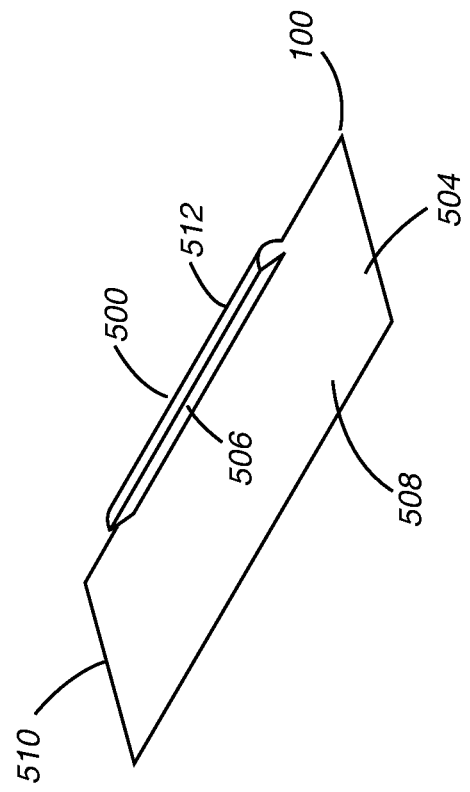
FIG. 5 is a perspective detail view of a second tab for securing a rigid planar sheet of the exterior cover to a laptop computer, in accordance with one embodiment of the present invention.

FIG. 5 is a perspective detail view of a second tab 500 for securing a rigid planar sheet of the exterior cover 100 to a laptop computer 190, in accordance with one embodiment of the present invention. The second tab 500 may describe tab 136 of FIG. 1 in more detail. FIG. 5 shows that second tab 500 is attached to a top surface 504 of a rigid planar sheet 510, and possible a raised edge (not shown), analogous to raised edge 104 or 114. The second tab 500 includes a flat surface 506 that slopes inward or extends toward the inside surface 508 of the rigid planar sheet 510. The flat surface 506 connects to the top surface 504 of the rigid planar sheet 510 or a raised edge. The second tab 500 has a rounded back 512 that curves back away from the surface 506 and connects to the top surface 504 of the rigid planar sheet 510 or a raised edge.

Figure 6:
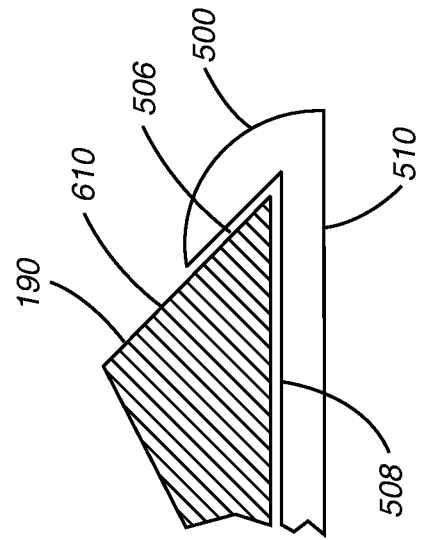
FIG. 6 is a cross-sectional detail view of the second tab for securing a rigid planar sheet of the exterior cover to a laptop computer, in accordance with one embodiment of the present invention.

FIG. 6 is a cross-sectional detail view of the second tab 500 for securing a rigid planar sheet of the exterior cover 100 to a laptop computer 190, in accordance with one embodiment of the present invention. FIG. 6 shows that flat surface 506 of second tab 500 slopes inward or extends toward the inside surface 508 of the rigid planar sheet 510. As the laptop 190 is inserted into the exterior cover 100, the second tab 500 may be pushed back or away from the inside surface 508 of the rigid planar sheet 510 so as to allow for the full width of the laptop 190 to be inserted into the exterior cover 100. The malleable or elastic nature of the material comprising the exterior cover 100, such as plastic, allows for the second tab 500 to be pushed back or away from the inside surface 508 of the rigid planar sheet 510 without breaking the second tab 500, while allowing for the second tab 500 to return to its initial shape or arrangement after the full width of the laptop 190 is inserted into the exterior cover 100.

FIG. 6 shows that after insertion of the pointed protrusion of laptop 190 into the exterior cover 100, the flat surface 506 of second tab 500 slopes inward toward the laptop, thereby extending over the top surface 610 of a pointed protrusion of the laptop 190 so as to grip the laptop 190. This positioning keeps the laptop 190 from moving upwards and exiting the exterior cover 100 since the second tab 500 grips the laptop 190 to secure it in place. Thus, second tab 500 secures the laptop 190 within the exterior cover 100. The application of enough force, however, may force the second tab 500 to be pushed back or away from the inside surface 508 of the rigid planar sheet 510 so as to allow for the full width of the laptop 190 to exit the exterior cover 100.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

The invention claimed is:

1. An exterior cover, comprising:
   a first elastic planar element for applying to an outside surface of a display portion of a laptop computer, wherein the first elastic planar element is malleable;
   a raised edge along a perimeter of the first elastic planar element;
   a plurality of tabs located on the raised edge, wherein each tab extends from the raised edge, wherein each tab is pushed away from an inside surface of the first elastic planar element to allow for the display portion of the laptop computer to be inserted into the first elastic planar element, and wherein each tab returns to its initial arrangement after the full width of the display portion of the laptop computer is inserted into the first elastic planar element;
   a second elastic planar element for applying to an outside surface of a keyboard portion of a laptop computer, wherein the second elastic planar element is separate and independent from the first elastic planar element, wherein the second elastic planar element is malleable;
   a raised edge along a perimeter of the second elastic planar element; and
   a plurality of tabs located on the raised edge, wherein each tab extends from the raised edge, wherein each tab is pushed away from an inside surface of the second elastic planar element to allow for the keyboard portion of the laptop computer to be inserted into the second elastic planar element, wherein each tab returns to its initial arrangement after the full width of the keyboard portion of the laptop computer is inserted into the second elastic planar element.

2. The exterior cover of claim 1, wherein the exterior cover is comprised of an elastic plastic material.

3. The exterior cover of claim 2, wherein the exterior cover is comprised of a colored, transparent plastic material.

4. The exterior cover of claim 1, wherein the first and second elastic planar elements comprise a substantially rectangular shape.

5. The exterior cover of claim 4, wherein the plurality of tabs of the first elastic planar element comprise four tabs.

6. The exterior cover of claim 5, wherein the plurality of tabs of the second elastic planar element comprise three tabs.

7. The exterior cover of claim 6, wherein the raised edge of the second elastic planar element includes at least one orifice for allowing access to a removable media port.

8. The exterior cover of claim 7, wherein each of the plurality of tabs of the first and second elastic planar elements extend from about one millimeter to about two millimeters from the raised edge.

9. A protective cover comprising:
   a first malleable rectangular sheet comprised of an elastic material for fastening to an outside surface of a display portion of a laptop computer;
   a plurality of protruding tabs located on opposing sides of the first malleable rectangular sheet, wherein each tab is pushed away from an inside surface of the first malleable rectangular sheet to allow for the display portion of the laptop computer to be inserted into the first malleable rectangular sheet, wherein each tab returns to its initial arrangement after the full width of the display portion of the laptop computer is inserted into the first malleable rectangular sheet;

a second malleable rectangular sheet comprised of an elastic material for fastening to an outside surface of a keyboard portion of a laptop computer, wherein the second malleable rectangular sheet is separate and independent from the first malleable rectangular sheet; and a plurality of protruding tabs located on opposing sides of the second malleable rectangular sheet, wherein each tab is pushed away from an inside surface of the second malleable rectangular sheet to allow for the keyboard portion of the laptop computer to be inserted into the second malleable rectangular sheet, wherein each tab returns to its initial arrangement after the full width of the keyboard portion of the laptop computer is inserted into the second malleable rectangular sheet.

10. The protective cover of claim 9, wherein the protective cover is comprised a heat-dissipating plastic material.

11. The protective cover of claim 9, wherein the protective cover is comprised of an elastic plastic material.

12. The protective cover of claim 9, wherein the protective cover is comprised of an elastic translucent plastic material.

13. The protective cover of claim 9, wherein each of the plurality of protruding tabs of the first and second malleable rectangular sheets extend from about one millimeter to about two millimeters in length.

14. An exterior cover for a laptop computer having a display portion and a keyboard portion, comprising:

a first elastic planar element having a rectangular shape, the first elastic planar element having a size sufficient to cover an outside surface of the display portion of the laptop computer, wherein the first elastic planar element is malleable, wherein the first elastic planar element includes:

a raised edge; and a plurality of tabs located on the raised edge, wherein each tab extends from the raised edge, wherein each tab is pushed away from an inside surface of the first elastic planar element to allow for the display portion of the laptop computer to be inserted into the first elastic planar element, and wherein each tab returns to its initial arrangement after the full width of the display portion of the laptop computer is inserted into the first elastic planar element; and a second elastic planar element having a rectangular shape, the second elastic planar element having a size sufficient to cover an outside surface of the keyboard portion of the laptop computer, wherein the second elastic planar element is malleable, wherein the second elastic planar element is separate and independent from the first elastic planar element, wherein the second elastic planar element include:

a raised edge; and a plurality of tabs located on the raised edge, wherein each tab extends from the raised edge, wherein each tab is pushed away from an inside surface of the second elastic planar element to allow for the keyboard portion of the laptop computer to be inserted into the second elastic planar element, and wherein each tab returns to its initial arrangement after the full width of the keyboard portion of the laptop computer is inserted into the second elastic planar element.

15. The exterior cover for a laptop computer having a display portion and a keyboard portion of claim 14, wherein the exterior cover is comprised of an elastic plastic material.

16. The exterior cover for a laptop computer having a display portion and a keyboard portion of claim 14, wherein each of the plurality of tabs of the first and second elastic planar elements are raised higher than the raised edge of the first and second elastic planar elements, respectively.

17. The exterior cover for a laptop computer having a display portion and a keyboard portion of claim 14, wherein the plurality of tabs of the first elastic planar element comprise four tabs.

18. The exterior cover for a laptop computer having a display portion and a keyboard portion of claim 17, wherein the plurality of tabs of the second elastic planar element comprise three tabs.

19. The exterior cover for a laptop computer having a display portion and a keyboard portion of claim 18, wherein the raised edge of the second elastic planar element includes at least one orifice for allowing access to a removable media port.

20. The exterior cover for a laptop computer having a display portion and a keyboard portion of claim 19, wherein each of the plurality of tabs of the first and second elastic planar elements extend from about one millimeter to about two millimeters from the raised edge.

* * * * *